United States Patent
Belpaire et al.

(10) Patent No.: US 9,079,615 B2
(45) Date of Patent: Jul. 14, 2015

(54) REINFORCER WITH PRE-APPLIED BONDING MATERIAL

(75) Inventors: Vincent Belpaire, Uccle (BE); François Godillon, Valenciennes (FR)

(73) Assignee: SIKA TECHNOLOGY AG, Baar (CH)

(*) Notice: Subject to any disclaimer, the term of this patent is extended or adjusted under 35 U.S.C. 154(b) by 527 days.

(21) Appl. No.: 13/313,662

(22) Filed: Dec. 7, 2011

(65) Prior Publication Data

US 2012/0141724 A1    Jun. 7, 2012

(30) Foreign Application Priority Data

Dec. 7, 2010  (EP) .................................. 10193982

(51) Int. Cl.
*B32B 3/06* (2006.01)
*B62D 29/00* (2006.01)

(52) U.S. Cl.
CPC ....... *B62D 29/002* (2013.01); *Y10T 428/24008* (2015.01)

(58) Field of Classification Search
CPC .................. Y10T 428/24008; Y10T 428/24; B32B 3/06; B32B 38/18; B29C 65/52
USPC ..................................... 428/99, 98
See application file for complete search history.

(56) References Cited

U.S. PATENT DOCUMENTS

| 5,631,027 A | 5/1997 | Takabatake |
| 6,247,287 B1 | 6/2001 | Takabatake |
| 2010/0092733 A1 | 4/2010 | Blank et al. |

FOREIGN PATENT DOCUMENTS

| EP | 1 790 554 A1 | 5/2007 | |
| WO | WO 2008/077944 A1 | 7/2008 | |
| WO | WO 2010/014681 A2 | 2/2010 | |
| WO | WO 2010014681 A2 * | 2/2010 | ............. B62D 29/00 |

OTHER PUBLICATIONS

European Search Report dated Apr. 15, 2011.

* cited by examiner

*Primary Examiner* — Brent O Hern
(74) *Attorney, Agent, or Firm* — Buchanan Ingersoll & Rooney PC (57) ABSTRACT

A reinforcement including at least two separate members that are secured to each other. The reinforcement may further include a bonding material that is disposed on at least one of the members and confined within an outer perimeter of the carrier. The bonding material may be configured to secure the carrier to the structure. The two members are secured to each other to permit at least one of translational and rotational relative movement therebetween such that one of the members engages the bonding material, thereby forcing the bonding material beyond the outer perimeter of the carrier.

17 Claims, 7 Drawing Sheets

REINFORCER WITH PRE-APPLIED BONDING MATERIAL

RELATED APPLICATION

This application claims priority under 35 U.S.C. §119 to European Patent Application No. 10193982.5 filed in Europe on Dec. 7, 2010, the entire content of which is hereby incorporated by reference in its entirety.

FIELD

A reinforcement and a method of making the same are disclosed. Exemplary reinforcements can include a carrier that is configured to be disposed within a structure. The carrier can include at least two separate members that are secured to each other.

BACKGROUND INFORMATION

Reinforcements provide structural support without a significant increase in cost and weight. For instance, reinforcements may be used in automobiles to reinforce cavities formed by various parts of the automobile such as a pillar, bumper, etc. To properly transfer loads from one side of the structure to the other, the reinforcement may have features that generally match the inner surfaces of the cavity in which the reinforcement is placed.

Reinforcements may be provided with an adhesive or bonding material that secures the reinforcement within a given cavity. Generally, such materials are provided on outer surfaces of the reinforcement in order to engage corresponding surfaces of the cavity upon insertion of the reinforcement into the cavity. However, such materials may be easily damaged prior to assembly, e.g., during shipping or handling of the reinforcement. Additionally, adhesive materials may be relatively soft, tacky, or otherwise difficult to handle directly, resulting in added difficulty in handling and/or installing the reinforcement.

SUMMARY

According to an exemplary aspect, a reinforcement is disclosed comprising:

a carrier configured to be disposed in a structure, the carrier defining an outer perimeter, the carrier including at least two members secured to each other; and a bonding material disposed on at least one of the members and confined within the outer perimeter, the bonding material configured to secure the carrier to the structure;

wherein the at least two members are secured to each other to permit at least one of translational and rotational relative movement therebetween such that one of the members engages the bonding material, thereby forcing the bonding material beyond the outer perimeter of the carrier.

According to an exemplary aspect, a method is disclosed, comprising:

providing a carrier configured to be disposed in a structure, the carrier defining an outer perimeter, the carrier including at least two members secured to each other;

applying a bonding material to at least one of the members, the bonding material applied within the outer perimeter of the carrier, the bonding material configured to secure the carrier to the structure; and securing the at least two members together to permit at least one of translational and rotational relative movement therebetween, including positioning one of the members to engage the bonding material during the at least one of translational and rotational movement, thereby forcing the bonding material beyond the outer perimeter of the carrier.

DETAILED DESCRIPTION

An exemplary reinforcement is disclosed that provides a bonding material for securing the reinforcement within the cavity while also protecting the bonding material from damage and allowing for simplified handling of the reinforcement.

An exemplary reinforcement may include a carrier that is configured to be disposed within a structure. The carrier may include at least two separate members that are secured to each other. The reinforcement may further include a bonding material that is disposed on at least one of the members and confined within an outer perimeter of the carrier. The bonding material may be configured to secure the carrier to the structure. The two members may be secured to each other to permit at least one of translational and rotational relative movement therebetween, such that one of the members engages the bonding material, thereby forcing the bonding material beyond the outer perimeter of the carrier.

Various exemplary illustrations are provided herein of a reinforcement and a method of making the same. Exemplary reinforcements may include a carrier that is configured to be disposed within a structure. The carrier may include at least two separate members that are secured to each other. The reinforcement may further include a bonding material that is disposed on at least one of the members and confined within an outer perimeter of the carrier. The bonding material may be configured to secure the carrier to the structure. The two members are secured to each other to permit at least one of translational and rotational relative movement therebetween such that one of the members engages the bonding material, thereby forcing the bonding material beyond the outer perimeter of the carrier.

In one exemplary illustration, the reinforcement facilitates handling around the outer perimeter by generally concealing the bonding material within the outer perimeter. The outer perimeter may generally allow for handling of the reinforcement with a dry, non-tacky surface or other handling feature, thereby preventing damage to the bonding material. Further, one or more movable members of the carrier are configured to generally force at least a portion of the bonding material to an outer surface or outer perimeter of the carrier, thereby positioning the bonding material for securing the reinforcement to a structure.

An exemplary method of forming a reinforcement includes providing a carrier, applying a bonding material to the carrier, and moving the bonding material from a storage position to a use position of the carrier. For example, bonding material may be disposed within an outer perimeter of the carrier to facilitate handing by outer surfaces of the carrier. The bonding material or portion thereof may be forced outwards to an outer surface of the carrier to facilitate securing the carrier within a structure.

Turning now to FIGS. 1A-1D, a first exemplary reinforcement 100 is illustrated. The reinforcement 100 is generally configured to reinforce a structure, for example by transferring loads from one sidewall of a structure to another sidewall of the structure. Reinforcement may take a variety of different forms and may include multiple and/or alternate components and facilities. While exemplary reinforcements are shown herein, the exemplary components illustrated in the Figures are not intended to be limiting. Indeed, additional or alternative and/or implementations may be used.

Figure 1A:
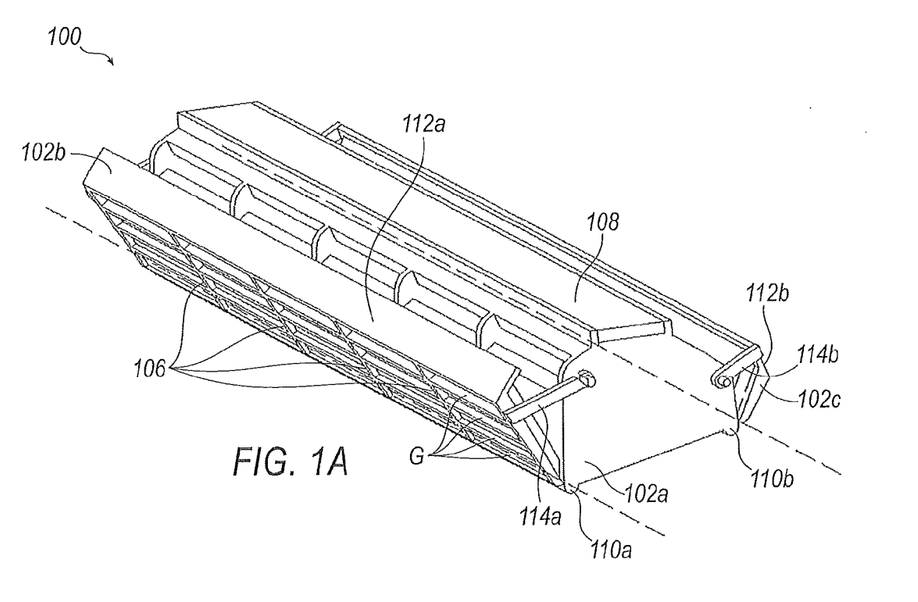
FIG. 1A illustrates a perspective view of an exemplary reinforcement.
Figure 1B:
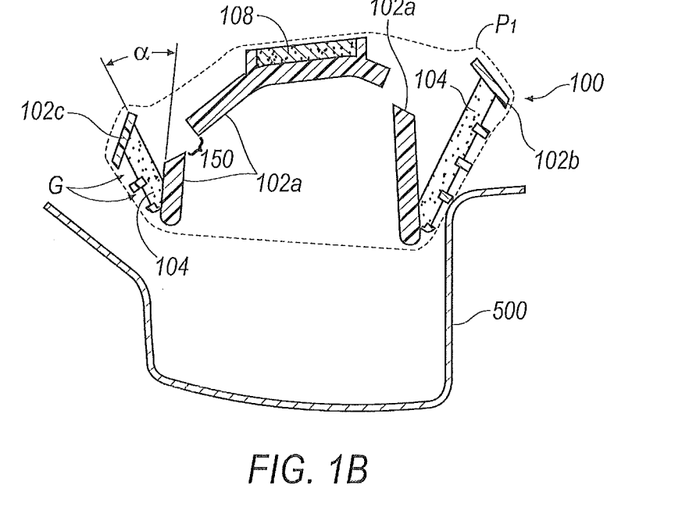
FIGS. 1B-1D illustrate exemplary cross-sectional views of the exemplary reinforcement of FIG. 1A during installation to an exemplary structure.
Figure 1C:
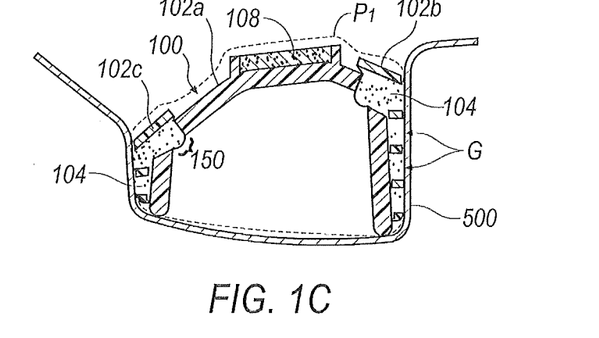
Figure 1D:
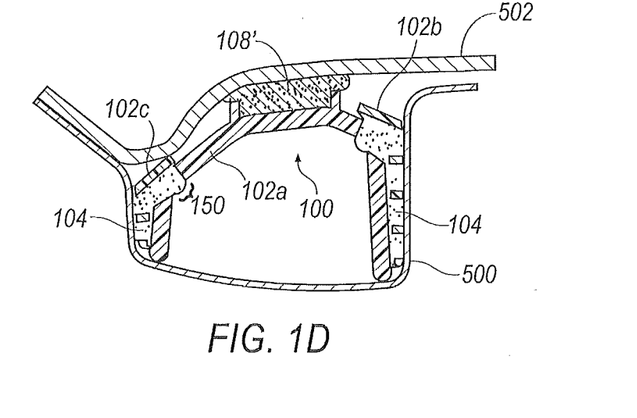

As seen in FIGS. 1A-1D, the reinforcement 100 generally includes a carrier 102 and a bonding material 104. The reinforcement may be positioned in a cavity that is formed by two panels 500, 502, as seen in FIGS. 1B-1D. The carrier 102 may be formed by any material that provides structural support to the panels 500, 502. For instance, the carrier 102 may be formed from a plastic such as nylon. The material forming the carrier 102 may further include glass fibers. Alternatively, the carrier 102 may be formed from a metal such as steel, aluminum, or magnesium merely as examples. The carrier 102 may be formed from any process that is convenient including, merely as examples, an injection molding, overmolding, casting, or die cut process.

The carrier 102 may include a plurality of members 102a, 102b, 102c that are configured to move relative to one another. For example, as seen in FIG. 1A, the carrier 102 is comprised of a core element or first member 102a and to lateral pivoting members 102b and 102c. For example, lateral member 102b may be secured to member 102a with a hinge 110a. Accordingly, the lateral member 102b may generally pivot with respect to member 102a. Additionally, lateral member 102c may be secured to member 102a by way of a second hinge 110b such that the lateral member 102c is able to pivot relative to member 102a.

The reinforcement 100 may further include an expandable foam material 108, e.g., a structural foam or an acoustic foam material, that is disposed on at least one of the carrier members 102. For example, as seen in FIGS. 1A, 1B, 1C, and 1D, carrier 102a includes a structural foam 108 that is applied to a top surface of the carrier member 102a. The structural foam 108 may be configured to expand into an expanded structural foam 108' upon application of heat, thereby engaging an upper panel 502 that cooperates with the first panel 500 to form a cavity receiving the reinforcement 100. Accordingly, the reinforcement 100 may generally strengthen and/or stiffen the structure formed by the panels 500, 502.

Foamable materials of this kind may foam under the influence of heat. An exemplary thermally foamable material is sold, for example, under the brand name SikaBaffle™ 240, or 250 or 255, and is described in U.S. Pat. Nos. 5,266,133 and 5,373,027, whose disclosures are hereby incorporated by reference in their entireties. Alternatively, the thermally expanding material may have reinforcing properties; material of this kind is sold, for example, under the brand name SikaReinforcer™ 941, and is described in U.S. Pat. No. 6,387,470, whose disclosure is also hereby incorporated by reference in its entirety. Other exemplary reinforcer materials include, but are not limited to, SikaReinforcer™ 911NT2, 911PB, 912, 913, 955. It is of course also possible to use other foamable materials, which may be activated by external heat sources or internal heat sources, such as by an exothermic reaction, for example.

Each of the lateral members 102b and 102c may be provided with locking members 114a and 114b, as seen in FIG. 1A. The locking members generally engage a distal end of each of the lateral members 102b and 102c with the first member 102a, thereby preventing pivoting motion of the lateral members 102b and 102c when it is not desired. For example, the locking members 114a and 114b may be engaged with the member 102a prior to assembly of the reinforcement 100 into the panels 500, 502.

As seen in FIGS. 1B-1C, the reinforcement 100 further includes a bonding material 104 provided on at least one element of the carrier 102. More specifically, as seen in FIG. 1B, two separate quantities 104a, 104b of bonding material 104 are provided on each of the pivoting members 102b and 102c, respectively. The bonding material 104 is generally disposed at least partially in a gap between each of the pivoting members 102b and 102c and the central member 102a. The angular gap may be defined by an angle, e.g., angle α between the central member 102a and lateral member 102c.

The lateral members 102b and 102c may define a plurality of gaps G between a plurality of outer contact element 106 of the lateral members 102b and 102c. Upon insertion of the reinforcement 100 into panel 500, as seen in FIG. 1B, bonding material 104 is generally squeezed by the rotation of the lateral members 102b, 102c toward the central member 102a, thereby forcing at least some of the bonding material 104 through the gaps G of the lateral members 102c and 102b. The bonding material 104 is thus forced beyond an outer perimeter $P_1$ of the carrier 102, thereby positioning at least a portion of the bonding material 104 on an outer surface of the carrier for contact with one or more panels 500, 502 of the cavity. The bonding material 104 may thereby secure the reinforcement 100 within the panels 500, 502.

Bonding material 104 may generally be configured to secure the carrier 102 to the panels 500 and 502. For example, the bonding material may include at least one of an expandable material, an adhesive and a selectively activated bonding agent. The bonding material 104 may thereby generally secure the carrier 102 within the panel 500, at least semi-permanently. In some examples, the bonding material 104 is configured to be activated by application of heat. Alternately, the bonding material 104 may be activated by applying a hardener or other bonding agent or compound to the bonding material 104.

In one exemplary illustration, the bonding material 104 may be soft and/or tacky to facilitate initial securement of the reinforcement 100 to the panels 500, 502. The bonding material 104 may be generally protected from contact, e.g., during handling prior to insertion of the reinforcement 100 into the lower panel 500, by the outer contact elements 106, which generally define the outer perimeter $P_1$. Accordingly, the bonding material 104 can be advantageously protected from damage due to handling, and also does not interfere or otherwise complicate handling due to the soft and/or tacky nature of the bonding material 104.

Various exemplary bonding materials 104 are described, merely as examples, in International Patent Publication No. WO 2008/077944 and corresponding U.S. Pat. Application Publication No. 2010/0092733, the contents of each being hereby expressly incorporated by reference in their entireties.

Exemplary adhesives or bonding materials 104 may be adapted to the desired conditions. For example, desired mechanical properties can be selected specifically, which by contrast may be only of limited possibility in the case of foamable materials generally. Moreover, there can be little problems with ageing of the bonding materials 104, and there is no loss of properties in the course of transit, storage or installation.

In one exemplary illustration, bonding material 104 may include a reactive adhesive that cures or allows securing of a carrier after addition of a curing agent and/or heat. There are a very wide variety of systems that can be employed for the reactive adhesive. A reactive adhesive, in accordance with the temperatures which occur subsequently in the operation, can be selected such that sufficiently quick curing takes place to give the desired mechanical properties. If, for example, the part passes through a standard paint drying oven at temperatures of 165-180 degrees Celsius for about 30 minutes, then a typical structural 1K [one-component] epoxide-based structural adhesive may be utilized. In another exemplary illustration, bonding material 104 includes a single-component heat-curable paste that generally maintains its shape up to 50 degrees Celsius, is generally flowable or squeezable at room temperature, and cures or hardens at temperatures typical of electro-coating and/or paint ovens associated, e.g., with vehicle assemblies. Further, the bonding material 104 may resist curing or reaction for a predetermined time, e.g., an "open time," to allow transport, preparation, and delivery to a final assembly location. In one exemplary illustration, bonding material 104 has an open time of at least 2 hours, and in some cases may be longer than three months. The bonding material 104 may also be solid and/or dry to the touch at temperatures less than approximately 40 degrees Celsius, becoming activated by heat, infra-red radiation, or chemical reaction with an activating agent, to form a flowable or squeezable paste prior to assembly. Bonding material 104 may also be covered with a protective film that is manually removed or thermally melted prior to final assembly.

It is therefore possible in each case to select a bonding material 104 or adhesive which corresponds to the conditions desired by the manufacturer. It is also possible to adapt the nature of the adhesive immediately to altered on-site production conditions without changing the carrier element. If, for example, the reinforcing part is to be installed at a higher temperature than initially planned, for example to simplify the production operation, a bonding material 104 is simply used which cures at the corresponding temperature.

An exemplary one-component reactive adhesive which can be used for the bonding material 104 is a storage-stable polymer composition which comprises at least one resin A that enters into polymerization reactions, at least one curing agent B, for example a blocked curing agent, at least one additive D, and also, optionally, further components, with, for example, at least one of the components A or B being present in a blocked form.

As noted above, the carrier 102 can include one or more outer contact elements 106 along the outer perimeter $P_1$ of the carrier. For example, as seen in FIG. 1A, lateral member 102b defines a plurality of gaps G between a corresponding plurality of contact elements 106, which generally have a rib-like structure defining the gaps G. The gaps G generally provide a passage for bonding material 104 to flow through, e.g., as seen in FIGS. 1C and 1D, when it is forced outside of the outer perimeter $P_1$ of the carrier 102. For example, bonding material 104 may be forced outside the outer perimeter $P_1$ when the reinforcement 100 is installed into the panel 500. In one exemplary illustration, the rib-like structures are spaced apart by at least approximately four millimeters (mm). Any other configuration or spacing of the gaps G and/or outer contact elements 106 may be employed that is convenient. The gaps G and/or spacing of outer contact elements 106 may generally be configured to provide a desired thickness of the bonding material 104 along the outer surfaces of the reinforcement 100, thereby optimizing securement of the reinforcement 100 within the cavity formed by the panels 500, 502.

Each of the lateral rotating members 102b and 102c of the reinforcement 100 may also include cover elements 112a and 112b. The cover elements 112 can generally prevent excess of the bonding material 104 from flowing upwards and out of the cavity where they may otherwise interfere with weld seams or otherwise inhibit placement of the upper panel 502 on the lower panel 500. For example, as seen in FIGS. 1C and 1D, as the lateral members 102b, 102c are rotated toward the central member 102a, the bonding material 104 is permitted to flow laterally outwards beyond the perimeter P1 of the carrier 102. The covers 112 engage the central member 102a, thereby blocking or inhibiting the bonding material 104 from flowing upward and engaging the upper panel 502 directly. Accordingly, the bonding material 104 does not interfere with positioning of the upper panel 502.

One or more channels, cuts, or cavities may also be formed in various portions of the carrier 102 to optimize or alter an amount of bonding material 104 that is forced outwards beyond the perimeter $P_1$ of the carrier 102. For example, as seen in FIGS. 1B-1D, a gap 150 may be formed between the lateral member 102c and the central member 102a, thereby allowing at least some of the bonding material 104 to be received within the carrier 102. Such gaps or other features such as channels or cavities within or between the members 102 may be provided to prevent an excess of the bonding material 104 from being forced outwards beyond the perimeter $P_1$ of the carrier.

Referring now to FIGS. 1B-1D, installation of an exemplary reinforcement 100 will be described in further detail. Reinforcement 100 may be positioned above panel 500 initially, e.g., as shown in FIG. 1B. Lateral members 102c and 102b are initially positioned away from central member 102a. Additionally, bonding material 104 is disposed within an outer perimeter $P_1$ of the carrier 102. Accordingly, in this state the bonding material 104 is generally contained within the outer perimeter $P_1$ of the carrier 102, thereby allowing safe and easy handling of the reinforcement 100 and preventing damage and/or contact with the bonding material 104.

Proceeding to FIG. 1C, the reinforcement 100 is lowered into the panel 500. Each of the lateral rotating members 102b and 102c are pivoted toward central member 102a, thereby forcing at least a portion of the bonding material 104 beyond the outer perimeter $P_1$ of the carrier 102. Accordingly, at least some portion of the bonding material 104 is positioned to engage inner surfaces of the panel 500, thereby securing the reinforcement within the panel 500. As seen in FIG. 1D, a cavity may be generally enclosed with upper panel 502. Additionally, the structural foam 108' may be expanded or enlarged, e.g., by the application of heat, thereby further reinforcing the structure formed by the lower panel 500, the upper panel 502 and the reinforcement 100.

The panels 500, 502 generally define a cavity or space receiving the reinforcement 100. The panels 500, 502 may at least partially extend in a parallel direction. The panels 500, 502 may further define openings (not shown) for receiving fasteners (not shown) that further support the reinforcement 100 within the cavity. However, the panels 500, 502 need not be parallel and non-parallel portions of the panels 500, 502 may be configured to receive the reinforcement 100. In one exemplary implementation, the cavity defined by the panels 500, 502 includes a portion of a vehicle. Thus, the cavity may be a pillar, bumper, door, etc., or portion thereof, of the vehicle.

Referring now to FIGS. 2A-2D, another exemplary reinforcement 200 is illustrated. As with reinforcement 100, reinforcement 200 generally includes a carrier 202 and a bonding material 204 that is provided on at least one member of the carrier 202. Reinforcement 200 generally allows for forcing bonding material 204 to an outer surface, e.g., beyond an outer perimeter $P_2$ of the carrier 202, through translational motion of one or more members 202. The bonding material 204 is generally maintained within the outer perimeter $P_2$ prior to translation of the members 202, as will be described further below. A spacer 222 may be provided to maintain desired spacing of the members 202 prior to installation into the panel 500, thereby preventing movement of the bonding material 204 prior to insertion into a cavity.

Figure 2A:
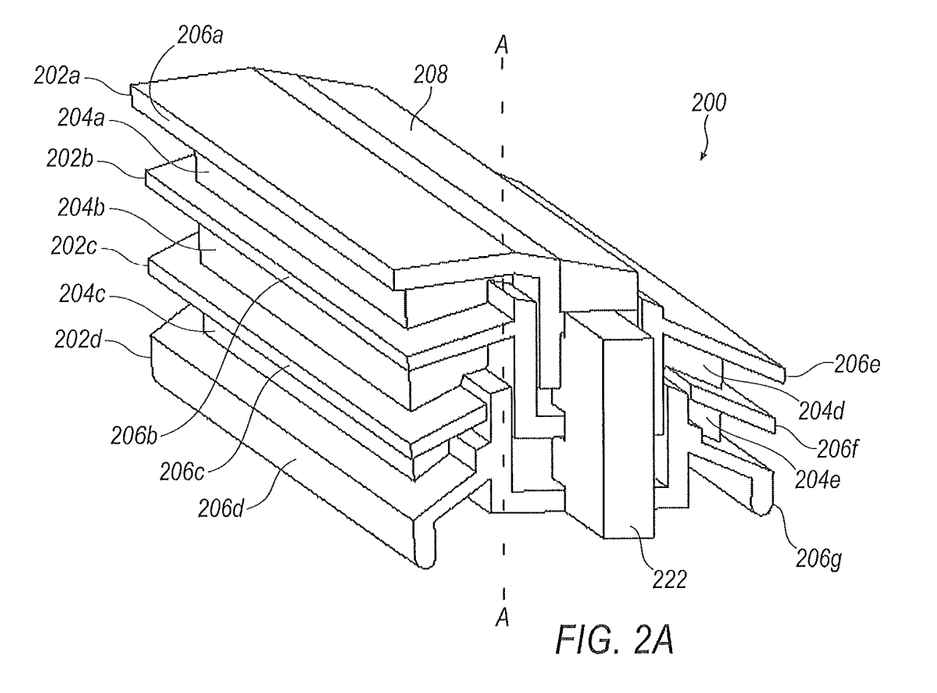
FIG. 2A illustrates a perspective view of another exemplary reinforcement.

The carrier 202 may include four separate members 202a, 202b, 202c, and 202d. The four members 202 each translate relative to each other along an axis A-A. Further, bonding material 204 is provided in a corresponding number of discrete portions positioned between the members 202. More specifically, bonding material is divided into discrete portions 204a, 204b, 204c, 204d, and 204e. Each of the discrete portions of the bonding material 204 are generally positioned between the members 202 of the reinforcement 200. The members 202 may thereby generally force or squeeze an amount of bonding material 204 laterally outwards beyond the outer perimeter $P_2$ for securing the reinforcement 200 to a structure. Accordingly, the bonding material 204 may be forced laterally outwards with respect to the axis A-A. More specifically, movement of the carrier members 202 in a first direction, i.e., parallel to the axis A-A, may force movement of the bonding material 204 in a direction generally perpendicular to the axis A-A.

The discrete portions of expandable material 204 may define different thicknesses, as measured along axis A-A. Accordingly, an amount of bonding material 204 that is forced from beyond the outer perimeter $P_2$ of the carrier 202 may be optimized for securing the reinforcement 200 within panel 500.

Figure 2B:
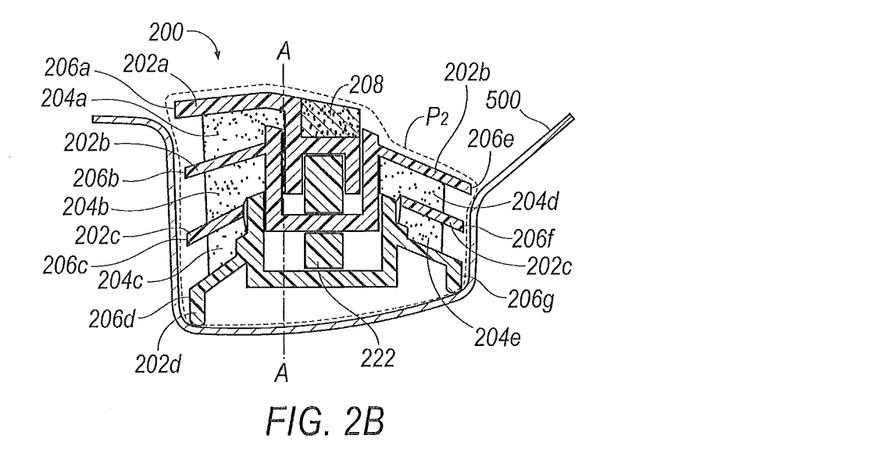
FIGS. 2B-2D illustrate exemplary cross-sectional views of the exemplary reinforcement of FIG. 2A during installation to an exemplary structure.
Figure 2C:
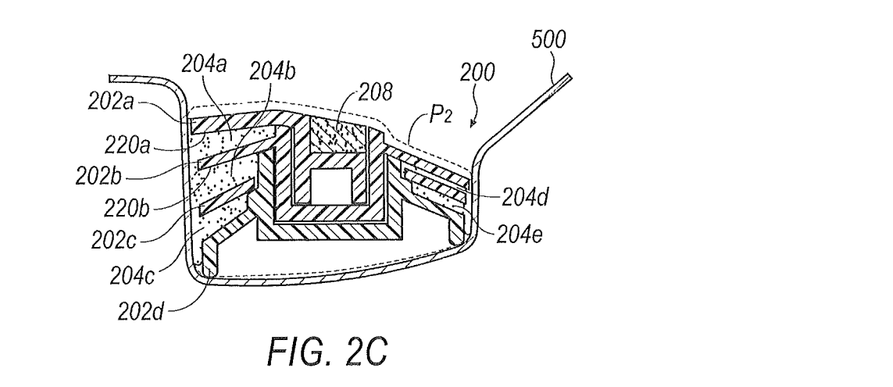
Figure 2D:
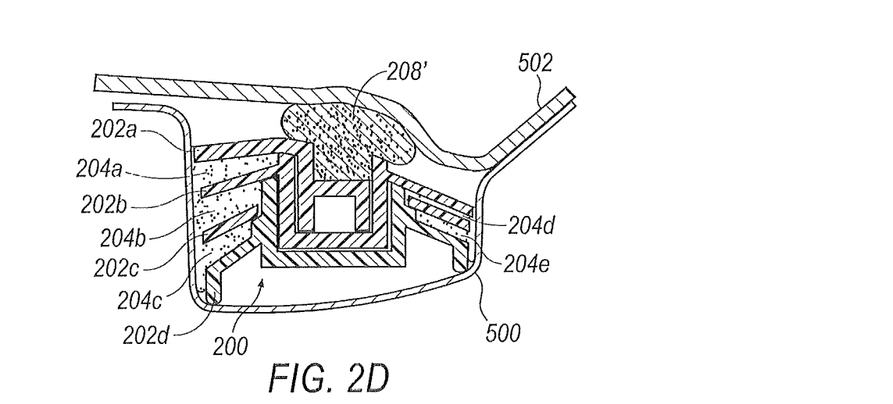

As seen in FIG. 2C, the various members 202 may each define corresponding angled surfaces facing portions of the bonding material 204. For example, angled surface 220a of member 202a faces angled surface 220b of member 202b. Each of the angled surfaces 220 generally abut one of the discrete portions 204a of the bonding material 204, such that translation of members 202a and 202b relative to one another forces the bonding material 204a beyond the outer perimeter $P_2$ of the reinforcement 200. Furthermore, as seen in FIGS. 2B-2D, each of this corresponding angled surfaces define an angle generally less than ninety (90) degrees with axis A-A. Accordingly, movement of the bonding material 204 may be optimized to provide a desired amount of bonding material 204 at desired positions about the outer surfaces of the carrier for applying the reinforcement to the lower panel 500. More specifically, the members 202 and thicknesses of the discrete portions of bonding material 204 may be configured to provide increased thicknesses of the bonding material 204 at desired positions about the perimeter $P_2$ of the carrier 202.

The carrier members 202 generally define outer contact elements 206 that are spaced laterally from the axis A-A of the carrier members 202. More specifically, the carrier member 202a defines a surface 206a, member 202b defines surfaces 206c, 206e, member 202c defines 206c, 206f, and member 202d defines surfaces 206d, 206g. The surfaces 206 extend along laterally outermost portions of the members 202 and generally provide dry or non-tacky surfaces for handling the reinforcement 200 prior to insertion into the lower panel 500. The surfaces 206 may thereby advantageously prevent contact with or damage to bonding material 204, or any portion thereof, prior to insertion of the reinforcement 200 into the cavity formed by the panels 500, 502.

As with reinforcement 100, reinforcement 200 may further include an expandable foam material 208, e.g., a structural foam or an acoustic foam material, that is disposed on at least one of the carrier members 202. For example, as seen in FIGS. 2A-2D, a structural foam 108 is applied to a top surface of the reinforcement 200, between members 202a, 202b. The structural foam 208 may be configured to expand into an expanded structural foam 208' upon application of heat, thereby engaging an upper panel 502 that cooperates with the first panel 500 to form a cavity receiving the reinforcement 200, as seen in FIG. 2D. Accordingly, the reinforcement 200 may generally strengthen and/or stiffen the structure formed by the panels 500, 502.

Figure 3A:
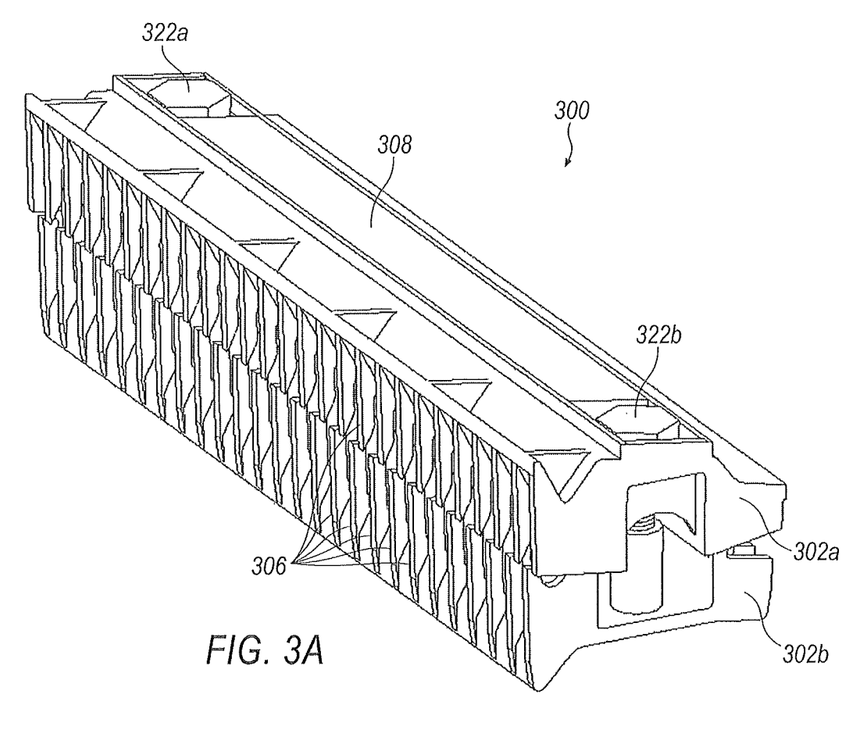
FIG. 3A illustrates a perspective view of another exemplary reinforcement.
Figure 3B:
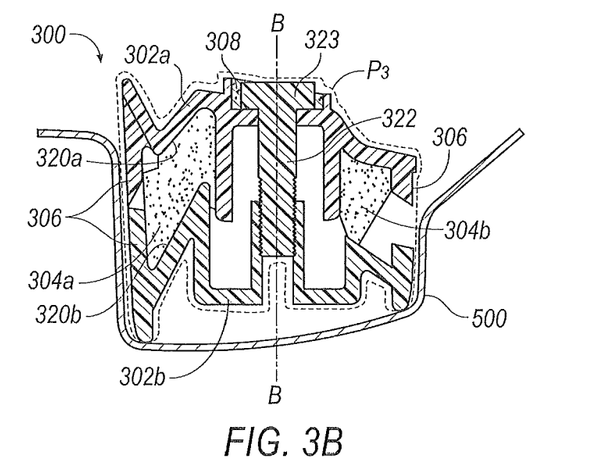
FIGS. 3B-3D illustrate exemplary cross-sectional views of the exemplary reinforcement of FIG. 3A during installation to an exemplary structure.

Turning now to FIGS. 3A-3D, another exemplary reinforcement 300 is described in further detail. Reinforcement 300 generally includes an upper member 302a and a lower member 302b. The upper and lower members 302a and 302b are configured to be translated relative to one another along an axis B-B, as seen in FIG. 3B. The reinforcement 300 further includes a bonding material 304 that is enclosed between the members 302, and within a outer perimeter $P_3$ of the reinforcement 300. When the upper member 302a is translated towards the lower 302b, bonding material is forced beyond the outer perimeter $P_3$ by corresponding angled surfaces 320a and 320b of the upper and lower members 302a, 302b, respectively.

Figure 3C:
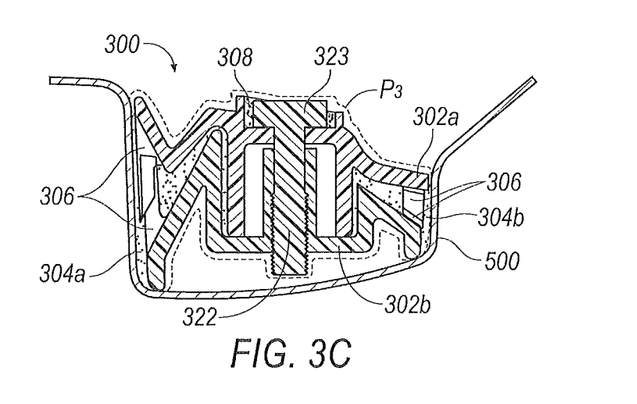
Figure 3D:
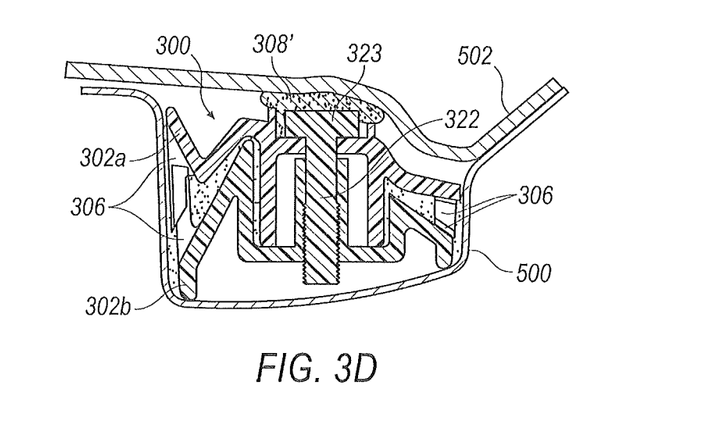

As seen in FIGS. 3B, 3C, and 3D, the upper and lower members 302a and 302b may be translated relative to one another by a threaded fastener 322. More specifically, the lower member 302b defines a threaded aperture that received a threaded portion of the fastener 322. The threaded fastener 322 extends through an aperture of the upper carrier member 302a, such that the fastener 322 may rotate relative to the upper member 302a. As the threaded fastener 322 is rotated and engages the threads of the aperture in the lower member 302b, a head portion 323 of the fastener 322 engages the upper member 302a, thereby pulling the members 302a, 302b together. The relative translational movement of the members 302a, 302b generally squeezes the bonding material 304 laterally outwards to expose at least a portion of the bonding material 304 beyond the outer perimeter $P_3$. The exposed bonding material 304 may thereby be positioned to secure the reinforcement 300 within the lower panel 500.

One or more spacers (not shown in FIGS. 3A-3D) may be provided between the carrier members 302a, 302b to prevent relative movement between the carriers 302a, 302b prior to insertion of the reinforcement 300 into the lower panel 500. Alternatively, the head 323 of threaded fastener 322 may be positively engaged with the upper carrier member 302b, thereby generally preventing movement of the upper member 302a toward lower member 302b when it is not desired, e.g., prior to insertion into the panel 500.

The corresponding angled surfaces 320a, 320b of the members 302a, 302b, respectively, may each define an angle relative to the movement of the members 302a, 302b, i.e., along axis B-B. Further, angled surface 320a may define an angle with the axis B-B that is different from that defined by the angled surface 320b. The angle formed by the angled surfaces 320a, 320b with the axis B-B may be any value that is convenient. For example, as shown in FIGS. 3B, 3C, and 3D, the angle may be less than ninety degrees.

The bonding material 304 may be divided into two discrete portions 304a, 304b that are disposed on either side of the fastener 322. The relative size and/or thicknesses of each portion 304a, 304b may be optimized to provide a desired thickness of the bonding material 304 about the outer surfaces of the carrier 302, e.g., around the outer perimeter $P_3$. For example, a greater amount of bonding material 304 may be desired where more is necessary to properly engage an inner surface of the panel 500. Alternatively, a smaller size and/or thickness of the portion 304b of the bonding material 304 may advantageously allow a smaller amount of the bonding material 304 to be forced out of the carrier 302, e.g., where less space is provided between the carrier 302 and the panel 500.

As seen in FIGS. 3A and 3C, the carrier members 302a, 302b each include a plurality of outer contact elements 306 that are spaced laterally from the axis B-B of the carrier members 302. More specifically, the carrier members 302 define a plurality of vertically extending comb members 306 that generally allow for handling of the reinforcement 300 about the perimeter $P_3$ of the reinforcement 300 without contacting the bonding material 304. As seen in FIG. 3A, the comb members 306 of upper carrier member 302a may be offset longitudinally from the comb members 306 of the lower carrier 302b. Accordingly, the comb members 306 may generally mesh together when the carrier members 302a, 302b are translated toward one another, e.g., as shown in FIGS. 3C and 3D. The comb members 306 may thereby advantageously prevent contact with or damage to bonding material 304, or any portion thereof, prior to the translation of the carrier members 302a, 302b toward each other.

Reinforcement 300 may also include an expandable foam material 308, e.g., a structural foam or an acoustic foam material, that is disposed on at least one of the carrier members 302. For example, as seen in FIGS. 3A-3D, a structural foam 308 is applied to a top surface of the upper member 302a. The structural foam 308 may be configured to expand into an expanded structural foam 308' upon application of heat, thereby engaging an upper panel 502 that cooperates with the first panel 500 to form a cavity receiving the reinforcement 300, as seen in FIG. 3D. Accordingly, the reinforcement 300 may generally strengthen and/or stiffen the structure formed by the panels 500, 502.

Figure 4:
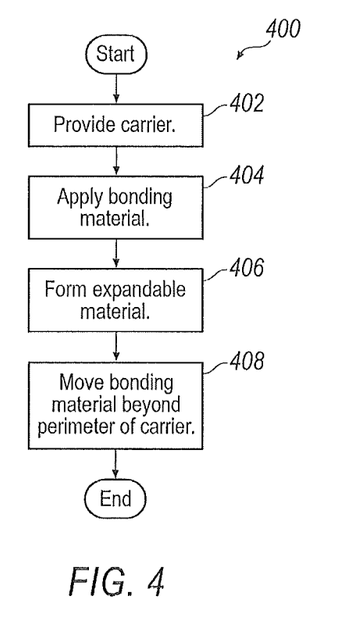
FIG. 4 illustrates a process flow diagram for an exemplary method of forming a reinforcement.

Turning now to FIG. 4, an exemplary process of forming a reinforcement is described. Process 400 may generally begin at block 402, where a carrier is provided. For example as described above, a carrier 102, 202, 302 may be provided that allows for at least one of relative translation or rotation between a plurality of members 102a,b,c, 202a,b,c,d, and 302a,b. Process 400 may then proceed to block 404.

At block 404, a bonding material may be applied to the carrier. For example, as noted above, a bonding material 104, 204, 304 may be applied to one or more carrier members 102, 202, 302. The bonding material 104 may be heat activatable and/or curable. Alternatively or in addition, the bonding material 104, 204, 304 may be generally tacky or soft upon application, thereby promoting securement of the carrier 102, 202, 302 to the relevant structure, e.g., panel 500. The bonding material 104, 204, 304 may also be positioned at least partially within a gap or angle defined between a plurality of the carrier members 102, 202, 302.

Proceeding to block 406, an expandable material may be formed. For example, an expandable structural foam material 108, 208, or 308 may be provided on the carrier 102, 202, or 302, as described above. In one exemplary illustration, the expandable material includes a structural foam that interact with panels 500 and/or 502 of the cavity, thereby cooperating with the carrier 102, 202, 302 to generally strengthen or stiffen the cavity. Process 400 may then proceed to block 408.

At block 408, the bonding material may be moved from within an outer perimeter of the carrier to a use position outside the perimeter of the carrier, for example, as described above.

Process 400 may then terminate.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed disclosure.

Accordingly, it is to be understood that the above description is intended to be illustrative and not restrictive. Many embodiments and applications other than the examples provided would be apparent upon reading the above description. The scope of the disclosure should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the disclosure is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A reinforcement, comprising:
   a carrier configured to be disposed in a structure, the carrier defining an outer perimeter, the carrier including at least two members secured to each other; and
   a bonding material disposed on at least one of the members and confined within the outer perimeter, the bonding material configured to secure the carrier to the structure;
   wherein the at least two members are secured to each other to permit at least one of translational and rotational relative movement therebetween such that one of the members engages the bonding material, thereby forcing the bonding material beyond the outer perimeter of the carrier.

2. The reinforcement as set forth in claim 1, wherein two of the members define a gap between them and wherein the bonding material is at least partially disposed in the gap.

3. The reinforcement as set forth in claim 1, wherein the members include a plurality of outer contact elements along the outer perimeter of the carrier, the outer contact elements defining a plurality of gaps therebetween to allow movement of the bonding material between the outer contact elements and beyond the outer perimeter of the carrier.

4. The reinforcement as set forth in claim 1, wherein two of the members are configured to translate toward each other in a first direction, thereby forcing the bonding material to move in a second direction substantially perpendicular to the first direction.

5. The reinforcement as set forth in claim 4, wherein the two members define corresponding angled surfaces each defining an angle less than 90 degrees with the first direction, wherein the bonding material is at least partially disposed between the corresponding angled surfaces.

6. The reinforcement as set forth in claim 5, wherein the corresponding angled surface of a first one of the two members defines a first angle with the first direction, and the corresponding angled surface of a second one of the two members defines a second angle with the first direction, the second angle different from the first angle.

7. The reinforcement as set forth in claim 4, further comprising a threaded member threadingly engaged with a first one of the two members, the threaded member abutting a second one of the two members to translate the second member toward the first member.

8. The reinforcement as set forth in claim 1, wherein the carrier includes at least three members configured to be selectively translated relative to each other, the three members defining at least two gaps between the three members, wherein the bonding material is at least partially disposed in each of the at least two gaps.

9. The reinforcement as set forth in claim 1, wherein at least one of the members is pivotably secured to another member to allow relative rotation therebetween.

10. The reinforcement as set forth in claim 1, wherein the carrier includes a plastic material and/or a metal material.

11. The reinforcement as set forth in claim 1, wherein the bonding material includes at least one of an expandable material, an adhesive, and a selectively activated bonding agent, the bonding material is configured to be activated by application of heat.

12. The reinforcement as set forth in claim 1, further comprising a structural foam material disposed on one of the members, the structural foam material configured to expand upon application of heat.

13. The reinforcement as set forth in claim 2, wherein the members include a plurality of outer contact elements along the outer perimeter of the carrier, the outer contact elements defining a plurality of gaps therebetween to allow movement of the bonding material between the outer contact elements and beyond the outer perimeter of the carrier.

14. The reinforcement as set forth in claim 2, wherein two of the members are configured to translate toward each other in a first direction, thereby forcing the bonding material to move in a second direction substantially perpendicular to the first direction.

15. The reinforcement as set forth in claim 3, wherein two of the members are configured to translate toward each other in a first direction, thereby forcing the bonding material to move in a second direction substantially perpendicular to the first direction.

16. The reinforcement as set forth in claim 2, wherein the carrier includes at least three members configured to be selectively translated relative to each other, the three members defining at least two gaps between the three members, wherein the bonding material is at least partially disposed in each of the at least two gaps.

17. The reinforcement as set forth in claim 3, wherein the carrier includes at least three members configured to be selectively translated relative to each other, the three members defining at least two gaps between the three members, wherein the bonding material is at least partially disposed in each of the at least two gaps.

* * * * *